(12) United States Patent
Nguyen

(10) Patent No.: US 6,566,919 B2
(45) Date of Patent: May 20, 2003

(54) POWER ON CIRCUIT FOR GENERATING RESET SIGNAL

(75) Inventor: Tam Nguyen, San Jose, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/726,690

(22) Filed: Nov. 29, 2000

(65) Prior Publication Data

US 2002/0063589 A1 May 30, 2002

(51) Int. Cl.[7] .................................................. H03L 7/00
(52) U.S. Cl. ........................................ 327/143; 327/546
(58) Field of Search ................................ 327/143, 198, 327/545, 546

(56) References Cited

U.S. PATENT DOCUMENTS

| | | | | |
|---|---|---|---|---|
| 4,446,381 A | * | 5/1984 | Dalrymple | 327/143 |
| 5,130,569 A | | 7/1992 | Glica | 327/143 |
| 5,177,375 A | * | 1/1993 | Ogawa et al. | 327/143 |
| 5,396,115 A | * | 3/1995 | Coffman et al. | 327/143 |
| 5,477,176 A | * | 12/1995 | Chang et al. | 327/142 |
| 5,517,144 A | * | 5/1996 | Nakashima | 327/198 |
| 5,847,586 A | * | 12/1998 | Burstein et al. | 327/143 |
| 6,204,703 B1 | * | 3/2001 | Kwon | 327/143 |

* cited by examiner

Primary Examiner—Terry D. Cunningham
Assistant Examiner—Quan Tra
(74) Attorney, Agent, or Firm—Gray Cary Ware & Freidenrich LLP

(57) ABSTRACT

A power reset signal generator provides a power reset signal having a minimum predetermined pulse width independent of the ramp time of the applied power.

12 Claims, 2 Drawing Sheets

POWER ON CIRCUIT FOR GENERATING RESET SIGNAL

BACKGROUND OF THE INVENTION

This invention relates to a power reset signal generator, and more particularly, to a power reset signal generator suitable for power application to an electronic circuit.

Electronic systems typically include a power reset circuit that generates a reset signal when the power applied to the system is either initially turned on or cycled from being turned off and then turned on. The electronic system uses the power reset signal to initialize various subsystems at power up. Because the power reset circuit is occasionally used, portable electronic systems typically require a low current draw for the power reset circuit in order to conserve battery power.

Manufacturers typically test electronic systems under controlled test conditions, which includes power reset testing. These controlled test conditions typically include a slow ramp time for the applied power. However, in user systems, the user frequently plugs the electronic system into an already powered system, and this provides what is commonly called "hot plug in". In such hot plug in situations, the power signal has a fast ramp time. Accordingly, devices that the manufacturer has tested under controlled conditions may fail in the field.

SUMMARY OF THE INVENTION

The present invention provides a power reset signal generator that is independent of the ramp time of the applied power. The present invention also provides a power reset signal generator that draws low current.

The present invention provides a power reset signal generator that includes a first voltage divider that provides a first reference signal in response to an applied power signal having a ramp time. The first reference signal is substantially equal to the voltage of the applied power signal for at least a portion of the ramp time in the event that the voltage of the applied signal is less than a threshold voltage and is substantially proportional to the voltage of the applied power signal in the event that the voltage of the applied signal is greater than the threshold voltage. The power signal generator also includes an inverter coupled to the output of the first voltage divider, and includes a second voltage divider having a first input coupled to an output of the first voltage divider, having a second input coupled to the output of the inverter, having an output for providing a reference signal. An NAND gate has a first input coupled to the output of the first voltage divider, a second input coupled to the output of the second voltage divider and an output for providing a power reset signal in response to the first and second reference signals.

The power reset generator may include a capacitor coupled to the second input of the second voltage divider for maintaining the voltage on the reference signal at a predetermined voltage level for a predetermined time. The pulse width of the power reset signal may be the greater of the predetermined time and a time of the voltage level of applied power signal becoming greater than the threshold voltage.

DETAILED DESCRIPTION

Figure 1:
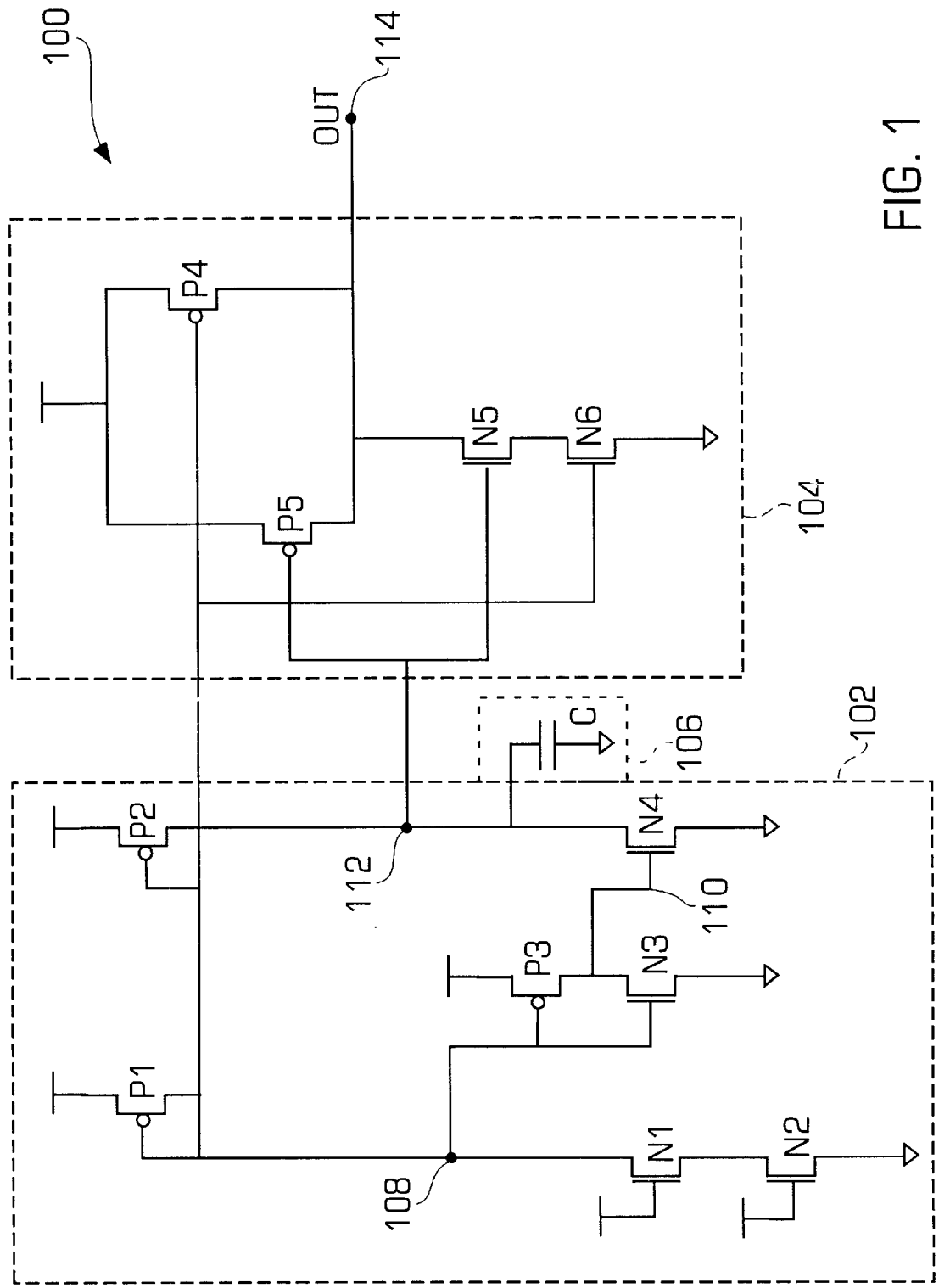
FIG. 1 is a schematic diagram of a power reset signal generator according to an embodiment of the present invention.

FIG. 1 is a schematic diagram of a power reset signal generator 100 according to an embodiment of the present invention. The power reset signal generator 100 comprises a control signal generator 102, a pulse generator 104, and a delay element 106. The power reset signal generator 100 comprises n-channel metal oxide semiconductor field effect transistors (NMOS transistors) N1, N2, N3, N4, N5, and N6, p-channel metal oxide semiconductor field effect transistors (PMOS transistors) P1, P2, P3, P4, P5 and P6 and a capacitor C.

The control signal generator 102 comprises the PMOS transistors P1, P2, and P3 and the NMOS transistors N1, N2, N3, and N4. The drain-source terminals of the PMOS transistor P1 and the NMOS transistors N1 and N2 are coupled in series between a power supply line and a ground line. A node 108 is formed of the common node of the source of the PMOS transistor P1 and the drain of the NMOS transistor N1. The PMOS transistor P1 and the NMOS transistors N1 and N2 form a voltage divider at the node 108. In one embodiment of the present invention, one of the NMOS transistors N1 and N2 may be omitted from the power reset signal generator 100. In another embodiment of the present invention, a resistor may be used instead of the NMOS transistors N1 and N2. In this embodiment, the resistance of the resistor preferably is large for a low current draw.

The drain-source terminals of the PMOS transistor P3 and the NMOS transistor N3 are coupled in series between the power supply line and the ground line to form a node 110 at the common node formed by the source terminal of the PMOS transistor P3 and the drain terminal of the NMOS transistor N3. The gates of the series coupled PMOS transistor P3 and the NMOS transistor N3 are coupled together and to the node 108. The series coupled PMOS transistor P3 and NMOS transistor N3 are arranged as an inverter. The signal from the node 108 is applied to the gates of the PMOS transistor P3 and the NMOS transistor N3 to provide an inverted signal at the node 110. In one embodiment of the present invention, the PMOS transistor P3 is weak relative to the NMOS transistor N3 to allow the NMOS transistor N3 to quickly ground the node 110. As used in the art, a first transistor is "weak" relative to a second transistor if the absolute value of the magnitude of the current provided by the first transistor is less than the absolute value of the magnitude of the current provided by the second transistor for a given absolute value of the applied voltage (for FETS, the voltage is VGS).

The drain-source terminals of the PMOS transistor P2 and the NMOS transistor N4 are coupled in series between the power supply line and the ground line to form a node 112 at the common node formed by the source of the PMOS transistors P2 and the drain of the NMOS transistors N4. The node 110 is coupled to the gate of the NMOS transistor N4 to selectively couple the node 112 to ground. The node 108 is coupled to the gate of the PMOS transistor P2 to selectively couple the node 112 to the power supply line.

The delay element 106 comprises the capacitor C, which couples the node 112 to ground.

In one embodiment of the present invention, the PMOS transistor P2 is weak relative to the PMOS transistor P1. In one example of such embodiment, the PMOS transistor P1 has dimensions W/L and provides a current $I_1$ and the PMOS transistor P2 has dimensions W/(L*N) and provides a current $I_1/N$.

The pulse generator 104 comprises the PMOS transistors P4 and P5 and the NMOS transistors N5 and N6. These transistors are arranged in a NAND gate configuration. Specifically, the drain-source terminals of the PMOS transistor P4 and the NMOS transistors N5 and N6 are coupled in series between the power supply line and the ground line. The source of the PMOS transistor P4 is coupled to the drain of the NMOS transistor N5 to form an output node 114. The gates of the PMOS transistor P4 and the NMOS transistor N6 are coupled together to form a common node as a first input of the NAND gate 104, which is coupled to the node 108. In one embodiment of the present invention, the trip point voltage of the first input of the NAND gate 104 has substantially the same trip point voltage as the inverter formed of the PMOS transistor P3 and the NMOS transistor N3. The drain-source terminals of the PMOS transistor P5 are coupled between the power supply line and the output node 114. The gate of the PMOS transistor P5 is coupled to the gate of the NMOS transistor N5 to form a common node as a second input of the NAND gate 104, which is coupled to the node 112. The node 108 and the node 112 provide the pair of inputs for the pulse generator 104. In one embodiment of the present invention, the PMOS transistor P4 is weak relative to the series connected NMOS transistors N5 and N6.

The output node 114 of the power reset signal generator 100 provides a reset signal independent of the rise time of an operational voltage Vcc applied to the power reset signal generator 100.

Figure 2:
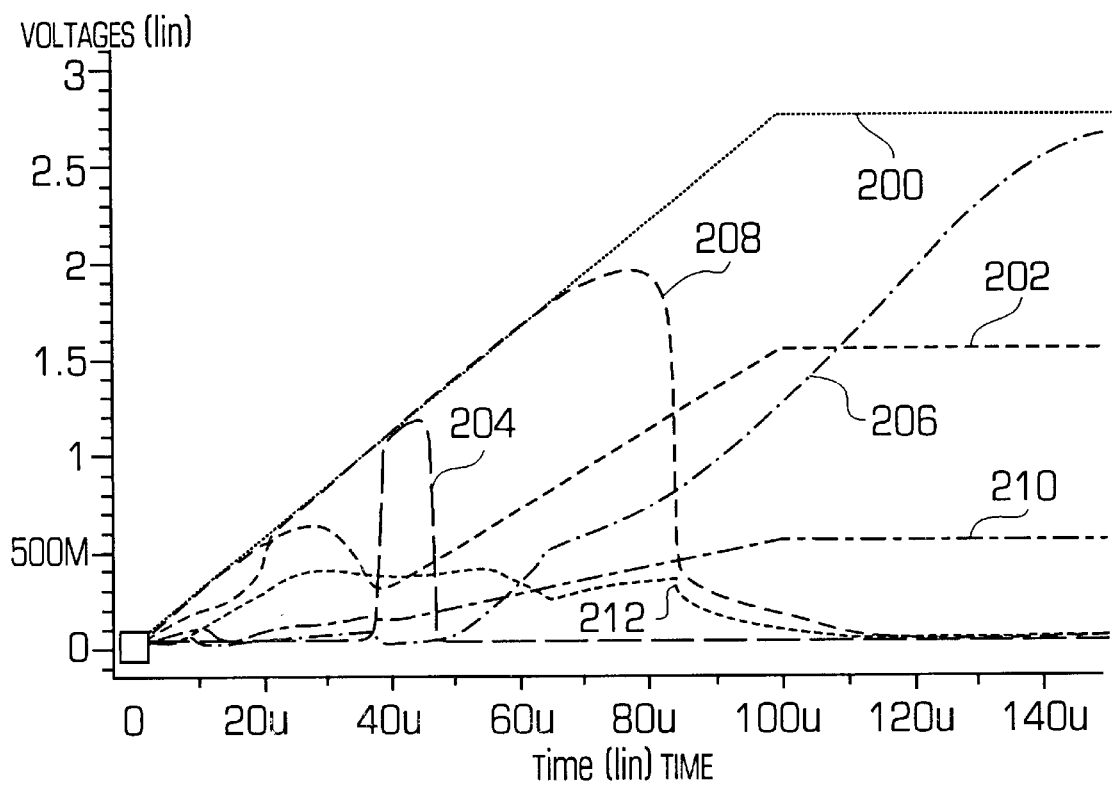
FIGS. 2 and 3 are timing diagrams of the power reset signal generator shown in FIG. 1.
Figure 3:
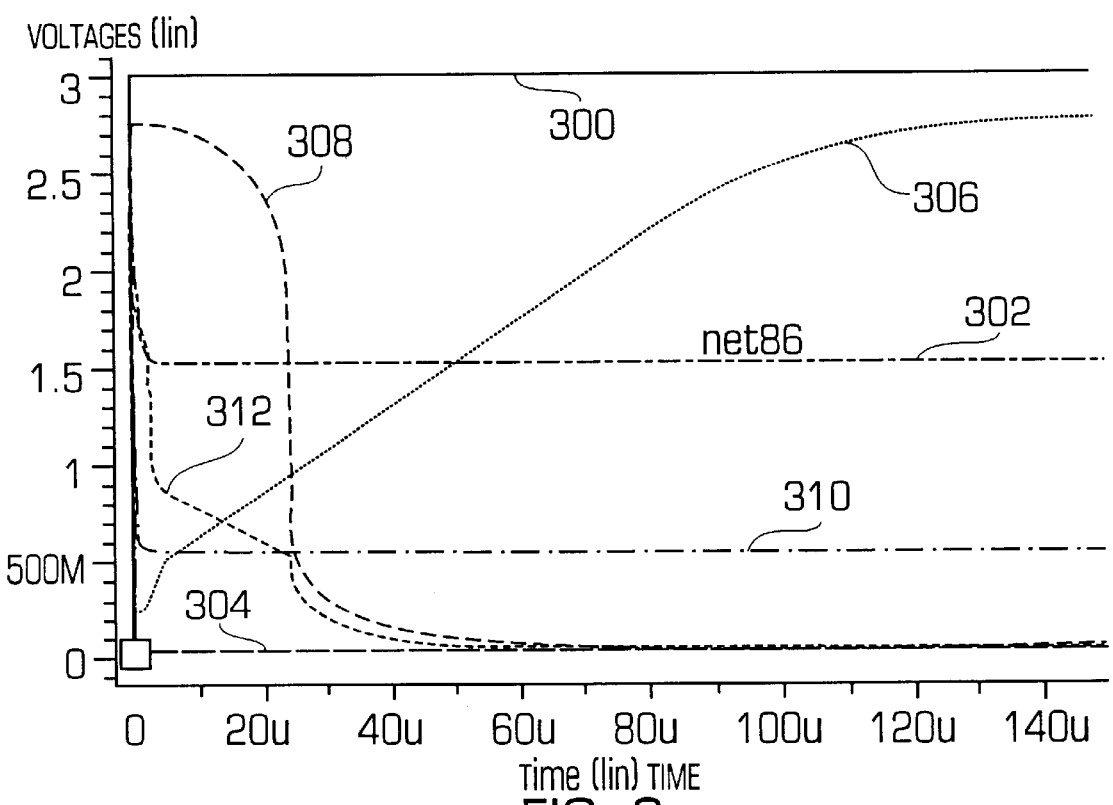

FIGS. 2 and 3 are timing diagrams of the power reset signal generator 100. The timing diagrams of FIGS. 2 and 3 are Simulation Program with Integrated Circuit Emphasis (SPICE) simulations of the power reset signal generator 100 for a respective slow and fast ramp time of the operational voltage. Referring now to FIG. 2, a line 200 shows the time relationship of the operational voltage applied to the power supply line for a slow ramp time. For illustration purposes, the timing diagram for a ramp time of 100 microseconds is shown. Lines 202, 204, 206, and 208 show the time relationship of the voltage of the nodes 108, 110, 112, and 114, respectively. Line 210 shows the time relationship of the voltage on the common node formed of the source of the NMOS transistor N1 and the drain of the NMOS transistor N2. Line 212 shows the time relationship of the voltage on the common node formed of the source of the NMOS transistor N5 and the drain of the NMOS transistor N6.

Initially (t=0) no operational voltage Vcc (Vcc=0) (line 200) is applied to the power reset signal generator 100, and all nodes 108, 110, 112, and 114 are at zero voltage. As the operational voltage Vcc is applied to the power reset signal generator 100 (inclined portion of line 200), the operational voltage Vcc rises turning on the NMOS transistors N1 and N2 thereby grounding the node 108 (line 202). The grounding of the node 108 also turns on the PMOS transistor P1 to pull the node 108 up to the operational voltage Vcc. As noted above, the circuit formed by the PMOS transistor P1 and the NMOS transistors N1 and N2 functions as a voltage divider. As shown in line 202, the voltage on the node 108 rises with the operational voltage Vcc and then experiences a drop for a period of time before rising linearly with the operational voltage Vcc.

During the initial application of the operational voltage Vcc, the grounding of the node 108 turns on the PMOS transistor P3 (and correspondingly the NMOS transistor N3 is kept turned off) thereby pulling the node 110 up to the operational voltage Vcc (line 204), and also turning on the NMOS transistor N4. The turning on of the NMOS transistor N4 pulls the node 112 to ground (line 206), which keeps the NMOS transistor N5 turned off and starts turning on the PMOS transistor P5. The output node 114 is pulled up to the operational voltage as the PMOS transistor P5 turns on (line 208). As the operational voltage rises, the voltage of the output node 114 rises.

Grounding the node 108 also turns on the PMOS transistors P1, P2 and P4 and turns off NMOS transistor N6. Specifically, when the operational voltage applied to the PMOS transistor P3 rises, the applied voltage to the PMOS transistor P3 allows the PMOS transistor to function as a transistor and consequently turn on because the voltage applied to the gate thereof from the node 108 is sufficiently low. The voltage on the node 110 is correspondingly Vcc. As the voltage on the node 108 rises, the PMOS transistor P3 turns off and the node 110 is grounded. In one embodiment of the present invention, the PMOS transistor P3 is much weaker than the NMOS transistor N3. As the voltage of the node 108 rises, even though the PMOS transistor P3 does not completely turn off, the NMOS transistor turns on sufficiently to cause the voltage of the node 110 to be sufficiently grounded to turn off the NMOS transistor N4. As the operational voltage Vcc reaches a trip point voltage of the circuit (Vtrip), the voltage on the node 108 becomes Vtrip (line 202) and the PMOS transistors P2 and P4 turn off and the NMOS transistor N6 turns on to thereby couple the output node 114 to ground so that the output node 114 provides a zero voltage signal (line 208). Thus the output node 114 provides a power reset signal during the ramp up time of the operational voltage Vcc.

Referring now to FIG. 3, the operation of the power reset signal generator 100 for a fast ramp time of the power signal is now described. For illustrative purposes, the timing diagram for a ramp time of 10 nanoseconds is shown. A line 300 shows the time relationship of the operational voltage applied to the power supply line for a fast ramp time. Lines 302, 304, 306 and 308 show the voltage on the nodes 108, 110, 112, and 114, respectively. Line 310 shows the time relationship of the voltage on the common node formed of the source of the NMOS transistor N1 and the drain of the NMOS transistor N2. Line 312 shows the time relationship of the voltage on the common node formed of the source of the NMOS transistor N5 and the drain of the NMOS transistor N6.

If the ramp time of the operational voltage is sufficiently fast, the voltage level on the node 108 is high for a very short time (line 302) and the power reset signal generator 100 does not reset without the capacitor C. Specifically, the voltage level (line 302) on the node 108 is high or overshoots for a short time until the NMOS transistors N1 and N2 are sufficiently turned on and the PMOS transistor P1 is sufficiently turned off so that these transistors can operate as a voltage divider. The voltage level on the node 108 reaches a steady state divided voltage level (line 302). Likewise, the voltage level (line 304) on the node 110 is high for a short time before rapidly falling to zero, and the NMOS transistor N3 is turned on and the PMOS transistor P3 is substantially turned off. Because the ramp time of the operational voltage (line 300) is fast, the PMOS transistor P1 and the NMOS transistors N1 and N2 are turned on quickly which quickly pulls the voltage on the node 108 (line 302) to the operational voltage Vcc (line 300) before rapidly becoming the divided voltage when the NMOS transistors N1 and N2 are turned on. Likewise, the voltage on the node 110 (line 304) quickly becomes 0 when the operational voltage reaches Vcc.

The capacitor C retains the voltage of the node 112 at a sufficiently high voltage level to reset the power reset signal generator 100. The PMOS transistor P2 provides a current to the node 112 to thereby charge the capacitor C from a zero voltage to a trip voltage Vtrip in a pre-selected time. This charging keeps the output signal on the output node 114 at Vcc for a time T. In one embodiment of the present invention, the PMOS transistor P2 provides a current $I_1/N$ and the PMOS transistor P1 provides a current I. The current $I_1/N$ is selected to be small, and may be, for example, approximately about 10 nanoamps. In this embodiment, the capacitor C holds the output signal on the output node 114 high for a time $T=(C*N*Vtrip)/I_1$. Thus, by coupling the capacitor C between the node 112 and ground, the voltage on the node 112 rises much less quickly to the operational voltage Vcc (line 306). Accordingly, the output signal on the node 114 remains high until the voltage on the node 112 is sufficiently high to turn off the PMOS transistor P5 and turn on the NMOS transistor N5 (line 308). The NMOS transistor N5 is turned on after the NMOS transistor N6 to thereby couple the output node 114 to ground (line 308).

The power reset signal generator of the present invention provides a power reset signal that is substantially independent of the ramp time of the application of power to the power reset signal generator 100. This allows the circuit to be used in applications that have rapid power on such as hot plug and/or have slow turn on in normal power up conditions. The current draw of the power reset signal generator 100 is small so that the generator when used in portable electronic systems to thereby conserve battery power.

What is claimed is:

1. A power reset signal generator comprising:
   a first voltage divider having an output for providing a first reference signal in response to an applied power signal having a ramp time, the first reference signal being substantially equal to the voltage of the applied power signal for at least a portion of the ramp time in the event that the voltage of the applied power signal is less than a threshold voltage and being substantially proportional to the voltage of the applied power signal in the event that the voltage of the applied power signal is greater than the threshold voltage;
   an inverter coupled to the output of the first voltage divider;
   a second voltage divider having a first input coupled to an output of the first voltage divider, having a second input coupled to the output of the inverter, and having an output for providing a second reference signal; and
   a NAND gate having a first input coupled to the output of the first voltage divider, having a second input coupled to the output of the second voltage divider, and having an output for providing a power reset signal in response to the first and second reference signals.

2. The power reset generator of claim 1 further comprising a capacitor coupled to the output of the second voltage divider for maintaining the voltage of the second reference signal at a predetermined voltage level for a predetermined time.

3. The power reset signal generator of claim 2, wherein the pulse width of the power reset signal is the greater of the predetermined time and a time of the voltage level of the applied power signal becoming greater than the threshold voltage.

4. A circuit comprising:
   a first transistor of a first type having a drain coupled to a power signal line, having a gate, and having a source coupled to the gate;
   a first transistor of a second type having a drain coupled to the source of the first transistor of the first type to form a first node, and having a gate coupled to the power signal line and a source coupled to a ground line;
   a second transistor of the first type having a drain coupled to the power signal line, having a gate coupled to the first node, and having a source;
   a third transistor of the first type having a drain coupled to the power signal line, having a gate coupled to the first node, and having a source;
   a second transistor of the second type having a drain coupled to the source of the third transistor of the first type to form a second node, having a gate coupled to the gate of the third transistor of the first type, and having a source coupled to the ground signal line;
   a third transistor of the second type having a drain coupled to the source of the second transistor of the first type to form a third node, having a gate coupled to the second node, and having a source coupled to the ground signal line;
   a fourth transistor of the first type having a drain coupled to the power signal line, having a gate coupled to the first node, and having a source;
   a fifth transistor of the first type having a drain coupled to the power signal line, having a gate coupled to the third node, and having a source coupled to the source of the fourth transistor of the first type to form an output node;
   a fourth transistor of the second type having a drain coupled to the output node, having a gate coupled to the third node, and having a source;
   a fifth transistor of the second type having a drain coupled to the source of the fourth transistor of the second type, having a gate coupled to the first node, and having a source coupled to the ground signal line; and
   a capacitor coupled between the third node and the ground signal line.

5. The circuit of claim 4 wherein the first, second, third, fourth and fifth transistors of the first type are p-channel metal oxide semiconductor field effect transistors (MOSFETS), and the first, second, third, fourth and fifth transistors of the second type are n-channel MOSFETS.

6. A power reset signal generator comprising:
   a voltage divider including
      a first transistor of a first type having a drain coupled to a power signal line, having a gate, and having a source coupled to the gate, and
      a first transistor of a second type having a drain coupled to the source of the first transistor of the first type to form a first node, and having a gate coupled to the power signal line and a source coupled to a ground line;
   a control signal generator including
      a second transistor of the first type having a drain coupled to the power signal line, having a gate coupled to the first node, and having a source to provide a charging current,
      a third transistor of the first type having a drain coupled to the power signal line, having a gate coupled to the first node, and having a source,
      a second transistor of the second type having a drain coupled to the source of the third transistor of the first type to form a second node, having a gate coupled to the gate of the third transistor of the first type, and having a source coupled to the ground signal line,
      a third transistor of the second type having a drain coupled to the source of the second transistor of the first type to form a third node, having a gate coupled to the second node, and having a source coupled to the ground signal line, and a capacitor coupled between the third node and the ground signal line to hold a voltage of the third node at a predetermined voltage for a predetermined time; and a NAND gate including:
  a fourth transistor of the first type having a drain coupled to the power signal line, having a gate coupled to the first node, and having a source,
  a fifth transistor of the first type having a drain coupled to the power signal line, having a gate coupled to the third node, and having a source coupled to the source of the fourth transistor of the first type to form an output node,
  a fourth transistor of the second type having a drain coupled to the output node, having a gate coupled to the third node, and having a source,
  a fifth transistor of the second type having a drain coupled to the source of the fourth transistor of the second type, having a gate coupled to the gate of the first node, and having a source coupled to the ground signal line.

7. The circuit of claim 6 wherein the first, second, third, fourth and fifth transistors of the first type are p-channel MOSFETS, and the first, second, third, fourth and fifth transistors of the second type are n-channel MOSFETS.

8. A power reset signal generator comprising:
A NAND gate having first and second input terminals and having an output terminal for providing a power reset signal in response to either one of first and second control signals having a voltage level below a threshold voltage being applied to the first and second input terminals, respectively;

a voltage divider coupled to the first input terminal to provide the first control signal in response to an operational power signal being applied to the voltage divider, the first input signal having a voltage below the threshold voltage for a first time period and having a voltage above the threshold voltage after the first time period in response to the applied operational power increasing to an operational voltage level, the voltage divider including:
  a first p-channel MOSFET having drain-source terminals coupling a power signal line that provides the operational power signal to the first input terminal and having a gate coupled to the first input terminal, and
  a first n-channel MOSFET having drain-source terminals coupling the first input terminal to a ground line in response to the operational power signal being applied to a gate thereof;

a control signal generator coupled to the first and second input terminals and providing the second control signal in response to the first control signal, the second control signal having a voltage below the threshold voltage for a second time period and having a voltage above the threshold voltage after the second time period in response to the first control signal and to the voltage of the applied operational power signal increasing to the operational voltage, the control signal generator including
  an inverter including a second p-channel MOSFET having drain-source terminals coupling the power signal line to a first node in response to the first control signal having a low voltage level being applied to a gate thereof, and a second n-channel MOSFET having drain-source terminals coupling the first node to the ground line in response to the first control signal having a high voltage level being applied to a gate thereof;
  a third p-channel MOSFET having drain-source terminals coupling the power signal line to the second input terminal in response to the first control signal being applied to a gate thereof,
  a third n-channel MOSFET having drain-source terminals coupling the second input terminal to the ground line and having a gate coupled to the first node, and
  a capacitor coupled between the second input terminal and the ground line to hold a voltage of the second input terminal above a predetermined voltage for a predetermined time.

9. The power reset signal generator of claim 8 wherein the third p-channel MOSFET is weaker than the first p-channel MOSFET.

10. The power reset signal generator of claim 8 wherein the second p-channel MOSFET is weaker than the second n-channel MOSFET.

11. The power reset signal generator of claim 8 wherein the NAND gate includes:
  a fourth p-channel MOSFET having drain-source terminals coupling the power signal line to the output terminal, and having a gate coupled to the first input terminal,
  a fifth p-channel MOSFET having drain-source terminals coupling the power signal line to the output terminal, and having a gate coupled to the second input terminal,
  a fourth n-channel MOSFET having drain-source terminals coupling the output terminal to a second node, and having a gate coupled to the second input terminal,
  a fifth n-channel MOSFET having drain-source terminals coupling the second node to the ground signal line, and having a gate coupled to the gate of the first input terminal.

12. The power reset signal generator of claim 11 wherein the fourth p-channel MOSFET is weaker than the series connected fourth and fifth n-channel MOSFETS.

* * * * *